United States Patent
Wilkes

(10) Patent No.: US 9,892,058 B2
(45) Date of Patent: Feb. 13, 2018

(54) CENTRALLY MANAGED UNIFIED SHARED VIRTUAL ADDRESS SPACE

(71) Applicant: Advanced Micro Devices, Inc., Sunnyvale, CA (US)

(72) Inventor: John Wilkes, Bainbridge Island, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 42 days.

(21) Appl. No.: 14/970,940

(22) Filed: Dec. 16, 2015

(65) Prior Publication Data

US 2017/0177498 A1     Jun. 22, 2017

(51) Int. Cl.
*G06F 12/00* (2006.01)
*G06F 13/00* (2006.01)
(Continued)

(52) U.S. Cl.
CPC ...... *G06F 12/1027* (2013.01); *G06F 13/1673* (2013.01); *G06F 2212/682* (2013.01)

(58) Field of Classification Search
CPC ........ G06F 9/455; G06F 9/50; G06F 12/0246; G06F 12/0284; G06F 12/0292; G06F 12/10; G06F 12/1009; G06F 12/1018; G06F 12/1027; G06F 12/1036; G06F 12/1045; G06F 12/1054; G06F 12/1063; G06F 12/1072; G06F 12/1081; G06F 12/109; G06F 13/12; G06F 13/122; G06F 13/124;
(Continued)

(56) References Cited

U.S. PATENT DOCUMENTS 4,481,573 A * 11/1984 Fukunaga ........... G06F 12/0833
711/207
4,779,188 A * 10/1988 Gum ..................... G06F 9/4843
711/E12.061

(Continued)

OTHER PUBLICATIONS

A method for reducing TLB purge overheads associated with context switching between guests in a virtual machine environment; Mohan Parthsarathy, Hewlett-Packard Company; Research Disclosure, database No. RD547039; Nov. 2009;retrieved from https://rd.orbit.com/rd/search/RD547039.pdf on Mar. 24, 2017 (4 pages).*

(Continued)

*Primary Examiner* — Daniel C Chappell
(74) *Attorney, Agent, or Firm* — Rory D. Rankin; Meyertons, Hood, Kivlin, Kowert & Goetzel, P.C.

(57) ABSTRACT

Systems, apparatuses, and methods for managing a unified shared virtual address space. A host may execute system software and manage a plurality of nodes coupled to the host. The host may send work tasks to the nodes, and for each node, the host may externally manage the node's view of the system's virtual address space. Each node may have a central processing unit (CPU) style memory management unit (MMU) with an internal translation lookaside buffer (TLB). In one embodiment, the host may be coupled to a given node via an input/output memory management unit (IOMMU) interface, where the IOMMU frontend interface shares the TLB with the given node's MMU. In another embodiment, the host may control the given node's view of virtual address space via memory-mapped control registers.

20 Claims, 10 Drawing Sheets

(51) Int. Cl.
  *G06F 13/28* (2006.01)
  *G06F 12/1027* (2016.01)
  *G06F 13/16* (2006.01)

(58) Field of Classification Search
  CPC ...... G06F 13/126; G06F 13/128; G06F 13/14;
  G06F 13/16; G06F 13/1668; G06F
  13/1673; G06F 13/1678; G06F 13/1684;
  G06F 13/1689; G06F 13/1694; G06F
  2212/1016; G06F 2212/1021; G06F
  2212/1024; G06F 2212/1028; G06F
  2212/1041; G06F 2212/1044; G06F
  2212/15; G06F 2212/151; G06F
  2212/152; G06F 2212/154; G06F
  2212/28; G06F 2212/281; G06F
  2212/282; G06F 2212/283; G06F
  2212/284; G06F 2212/285; G06F
  2212/286; G06F 2212/30; G06F
  2212/301; G06F 2212/302; G06F
  2212/303; G06F 2212/3035; G06F
  2212/304; G06F 2212/3042; G06F
  2212/305; G06F 2212/306; G06F
  2212/50; G06F 2212/502; G06F
  2212/507; G06F 2212/65; G06F
  2212/651; G06F 2212/652; G06F
  2212/653; G06F 2212/654; G06F
  2212/655; G06F 2212/656; G06F
  2212/657; G06F 2212/68; G06F
  2212/681; G06F 2212/682; G06F
  2221/683; G06F 2212/684
  See application file for complete search history.

(56) References Cited

U.S. PATENT DOCUMENTS

| | | | | |
|---|---|---|---|---|
| 5,123,101 | A * | 6/1992 | Sindhu | G06F 12/1036 711/207 |
| 5,230,045 | A * | 7/1993 | Sindhu | G06F 12/1036 711/203 |
| 5,493,660 | A * | 2/1996 | Delano | G06F 12/1027 711/206 |
| 5,574,878 | A * | 11/1996 | Onodera | G06F 12/1036 711/207 |
| 5,640,533 | A * | 6/1997 | Hays | G06F 12/1027 711/133 |
| 5,644,748 | A * | 7/1997 | Utsunomiya | G06F 9/3824 711/207 |
| 5,740,417 | A | 4/1998 | Kennedy et al. | |
| 5,897,664 | A * | 4/1999 | Nesheim | G06F 12/0284 711/147 |
| 5,949,423 | A | 9/1999 | Olsen | |
| 6,226,012 | B1 | 5/2001 | Priem et al. | |
| 6,239,808 | B1 | 5/2001 | Kirk et al. | |
| 6,266,064 | B1 | 7/2001 | Snyder | |
| 6,266,753 | B1 * | 7/2001 | Hicok | G06F 12/1081 345/555 |
| 6,510,525 | B1 | 1/2003 | Nookala et al. | |
| 6,553,501 | B1 | 4/2003 | Yokoe | |
| 6,631,447 | B1 * | 10/2003 | Morioka | G06F 12/0815 711/118 |
| 6,681,239 | B1 * | 1/2004 | Munroe | G06F 12/109 711/E12.068 |
| 6,681,297 | B2 | 1/2004 | Chauvel et al. | |
| 6,751,706 | B2 * | 6/2004 | Chauvel | G06F 1/206 711/122 |
| 6,801,207 | B1 | 10/2004 | Tischler et al. | |
| 6,801,208 | B2 | 10/2004 | Keshava et al. | |
| 6,819,321 | B1 | 11/2004 | Hsieh et al. | |
| 6,825,848 | B1 | 11/2004 | Fu et al. | |
| 6,842,180 | B1 | 1/2005 | Maiyuran et al. | |
| 6,891,543 | B2 | 5/2005 | Wyatt | |
| 6,895,491 | B2 * | 5/2005 | Kjos | G06F 12/1027 711/173 |
| 6,954,864 | B2 | 10/2005 | Schelling | |
| 6,988,214 | B1 | 1/2006 | Verdun | |
| 7,023,445 | B1 | 4/2006 | Sell | |
| 7,030,877 | B1 | 4/2006 | Sell | |
| 7,152,169 | B2 | 12/2006 | Cooper et al. | |
| 7,159,766 | B2 | 1/2007 | Wurzburg et al. | |
| 7,200,762 | B2 | 4/2007 | Pearl | |
| 7,213,125 | B2 * | 5/2007 | de Dinechin | G06F 12/1036 711/147 |
| 7,383,415 | B2 * | 6/2008 | Jordan | G06F 12/1027 711/202 |
| 7,398,371 | B2 * | 7/2008 | Plondke | G06F 9/4812 710/260 |
| 7,716,673 | B2 * | 5/2010 | Chauvel | G06F 9/30174 711/202 |
| 8,028,185 | B2 | 9/2011 | Branover et al. | |
| 8,364,933 | B2 * | 1/2013 | Herrenschmidt | G06F 12/1018 711/207 |
| 8,607,008 | B1 * | 12/2013 | Glasco | G06F 12/1009 711/147 |
| 8,930,674 | B2 * | 1/2015 | Avudaiyappan | G06F 12/1027 710/52 |
| 9,405,702 | B2 * | 8/2016 | Mukherjee | G06F 12/1027 |
| 2004/0025161 | A1 * | 2/2004 | Chauvel | G06F 9/30174 718/102 |
| 2004/0260905 | A1 * | 12/2004 | Cypher | G06F 12/0822 711/203 |
| 2004/0260906 | A1 * | 12/2004 | Landin | G06F 12/0284 711/203 |
| 2006/0026382 | A1 * | 2/2006 | Hirano | G06F 12/1045 711/207 |
| 2006/0294288 | A1 * | 12/2006 | Seth | G06F 12/145 711/6 |
| 2006/0294341 | A1 * | 12/2006 | Plondke | G06F 9/4812 711/207 |
| 2007/0061547 | A1 * | 3/2007 | Jordan | G06F 12/1027 711/207 |
| 2008/0162868 | A1 * | 7/2008 | Glew | G06F 12/1027 711/203 |
| 2009/0150696 | A1 | 6/2009 | Song et al. | |
| 2009/0164814 | A1 | 6/2009 | Axford et al. | |
| 2010/0306499 | A1 * | 12/2010 | Petolino, Jr. | G06F 12/1027 711/207 |
| 2011/0208944 | A1 * | 8/2011 | Champagne | G06F 12/1027 711/207 |
| 2014/0040562 | A1 * | 2/2014 | Koka | G06F 12/10 711/141 |
| 2014/0101411 | A1 * | 4/2014 | Sakarda | G06F 9/3885 712/42 |
| 2015/0301953 | A1 * | 10/2015 | Bybell | G06F 12/1045 711/207 |
| 2016/0378674 | A1 * | 12/2016 | Cheng | G06F 12/1009 711/206 |

OTHER PUBLICATIONS

Definition of translation lookaside buffer (TLB); Margaret Rouse; Sep. 2014; retrieved from http://whatis.techtarget.com/definition/translation-look-aside-buffer-TLB on Mar. 24, 2017 (4 pages).*

Leakage Efficient TLB Design for Embedded Processors; Lei et al; IPSJ SIG Technical Report; 2009; retrieved from https://ipsj.ixsq.nii.ac.jp/ej/index.php?action=pages_view_main&active_action=repository_action_common_download&item_id=62709& item_no=1&attribute_id=1&file_no=1&page_id=13& block_id=8 on Mar. 24, 2017 (9 pages).*

Lazy TLB consistency for large-scale multiprocessors; Chang et al; Second Aizu International Symposium Parallel Algorithms/Architecture Synthesis; Mar. 17-21, 1997; pp. 308-315 (8 pages).*

Multiprocessing aspects of the PowerPC 601; Allen et al; Compcon Spring '93, Digest of Papers; Feb. 22-26, 1993; pp. 117-126 (10 pages).*

(56) References Cited

OTHER PUBLICATIONS

DiDi: Mitigating the Performance Impact of TLB Shootdowns Using a Shared TLB Directory; Villvieja et al; 2011 International Conference on Parallel Architectures and Compilation Techniques; Oct. 10-14, 2011; pp. 340-349 (10 pages).*

Scalable locality-conscious multithreaded memory allocation; Schneider et al; Proceedings of the 5th international symposium on Memory management; Jun. 10-11, 2006; pp. 84-94 (11 pages).*

Shebanow et al., U.S. Appl. No. 10/676,625, entitled "Caching Compressed Graphics Data for Reduced Power Consumption", filed Oct. 1, 2003, 32 pages.

Pabst, Thomas, "High-Tech and Vertex Juggling—NVIDIA's New GeForce3 GPU", Tom's Hardware, Feb. 27, 2001, 39 pages, http://www.tomshardware.com/print/high,reviews-294.html. [Retrieved Jan. 13, 2016].

Berillo, Aleksey, "S3TC and FXT1 Texture Compression", Nov. 30, 2000, IXBT Labs, 17 pages, http://ixbtlabs.com/articles/reviews3tcfxt1/. [Retrieved Jan. 13, 2016].

"Geode™ GX1 Processor Series Low Power Integrated x86 Solution", National Semiconductor Corporation, Jun. 2002, 246 pages, Revision 4.1.

Greene, et al., "Hierarchical Z-Buffer Visibility", '93 Proceedings of the 20th Annual Conference on Computer Graphics and Interactive Techniques, Sep. 1, 1993, 7 pages, ACM, New York, New York, USA.

"Advanced Configuration and Power Interface Specification", Hewlett-Packard Corporation, Intel Corporation, Microsoft Corporation, Phoenix Technologies Ltd., Toshiba Corporation, Oct. 10, 2006, pp. i-191.

"Advanced Configuration and Power Interface Specification", Hewlett-Packard Corporation, Intel Corporation, Microsoft Corporation, Phoenix Technologies Ltd., Toshiba Corporation, Oct. 10, 2006, pp. 192-402.

"Advanced Configuration and Power Interface Specification", Hewlett-Packard Corporation, Intel Corporation, Microsoft Corporation, Phoenix Technologies Ltd., Toshiba Corporation, Oct. 10, 2006, pp. 403-611.

* cited by examiner

Table 500

| Register | Description |
|---|---|
| CR0.PG | Bit 31, Paging Enable, Set by Software |
| CR2 | Set by Processor, Holds Faulting VA on Page-Fault Exception |
| CR3 | Base Address of Highest Level Page Table + Cache Controls for the Specified Table |
| EFER | Extended Feature Enable Register |
| .LME | Bit 8, Long Mode Enable |
| .LMA | Bit 10, Long Mode Active, Set by Processor when Long Mode and Paging are Enabled |
| .TCE | Bit 15, Translation Cache Extension, When Set INVLPG Invalidates only Upper Level TLB Entries which Lead to Target PTE, otherwise (when not set) all Upper Level TLB Entries are Invalidated |
| CR4.PGE | Bit 7, Page-Global Enable |
| CR4.PAE | Bit 5, Physical Address Extension, Required by Long Mode |
| CR4.PSE | Bit 4, Page Size Extensions, Enables 4 MB Pages, Ignored in Long Mode |

CENTRALLY MANAGED UNIFIED SHARED VIRTUAL ADDRESS SPACE

The invention described herein was made with government support under contract number DE-AC52-07NA27344, subcontract number B608045, awarded by the United States Department of Energy. The United States Government has certain rights in the invention.

BACKGROUND

Technical Field

Embodiments described herein relate to processors and more particularly, to managing a unified shared virtual address space between multiple processors.

Description of the Related Art

Modern central processing units (CPUs) have a memory management unit (MMU) which consists of a page-based address translation table (i.e., page table) in memory which typically has multiple levels and supports variable page sizes. The CPU maintains a cache of recent address translations (i.e., translation lookaside buffer or "TLB") which is used for instruction and data references. The MMU enables a process running on the CPU to have a view of memory that is linear and contiguous (i.e., the "virtual address space") while the actual memory locations can be sparsely scattered in real memory (i.e., the "physical address space").

When a process running on the CPU references a virtual address that is not found in the TLB, the process stalls while the CPU looks for a valid translation in the page table. This is called a "table walk" and is usually done by hardware, though some architectures perform the table walk in software. If the referenced virtual address does not have a valid translation in the page table (e.g., the Present (P) Bit is not set in the lowest level page table entry on an x86 CPU), an exception is raised which activates a software handler that has the option to correct the problem and retry the faulting instruction.

The input/output MMU (IOMMU) performs virtual address translation for direct memory access (DMA) by peripheral devices. When a translation is not found in the IOMMU TLB, the IOMMU performs a table walk. If a page fault is detected, the faulting request is aborted. The IOMMU has no mechanism to activate a software handler which could correct the problem, nor is there a mechanism to signal a peripheral to retry a faulting request. In systems with multiple CPUs executing multiple operating system (OS) instances, typically each CPU manages its own view of the system's virtual address space. This results in redundant software and hardware being utilized in each of the multiple CPUs, taking up software resources and valuable space that could otherwise be utilized to perform other functions.

SUMMARY

Systems, apparatuses, and methods for managing a unified shared virtual address space are contemplated.

In one embodiment, a computing system may include at least a host processor and a secondary processor. In one embodiment, the secondary processor may be a processing-in-memory (PIM) node. The secondary processor may have a CPU-style MMU but the secondary processor may be configured to present an IOMMU-style interface to the host processor. Configuration and management of the secondary processor's TLB may be performed by the host processor.

In another embodiment, the MMU control registers of the secondary processor may be mapped into the memory space of the host processor. A page fault or other exception on the secondary processor may generate an interrupt to the host processor. Software running on the host processor would have the option of correcting the problem (e.g., by modifying the in-memory page table and releasing the secondary processor to continue operation).

In a further embodiment, the host processor and secondary processor may be able to trade-off handling memory management for each other depending on the operating mode. For example, the host processor may handle memory management for the secondary processor during a first mode of operation. Then, in a second mode of operation corresponding to a low-power environment or reduced processing load on the system, the host processor may be powered down while the secondary processor remains active. During this time when the host processor is turned off, the secondary processor may handle memory management for the host processor. The secondary processor may be configured to turn on the host processor as needed and pre-populate the TLB of the host processor to reduce the startup latency of the host processor.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5 illustrates a table of control registers in accordance with one embodiment.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
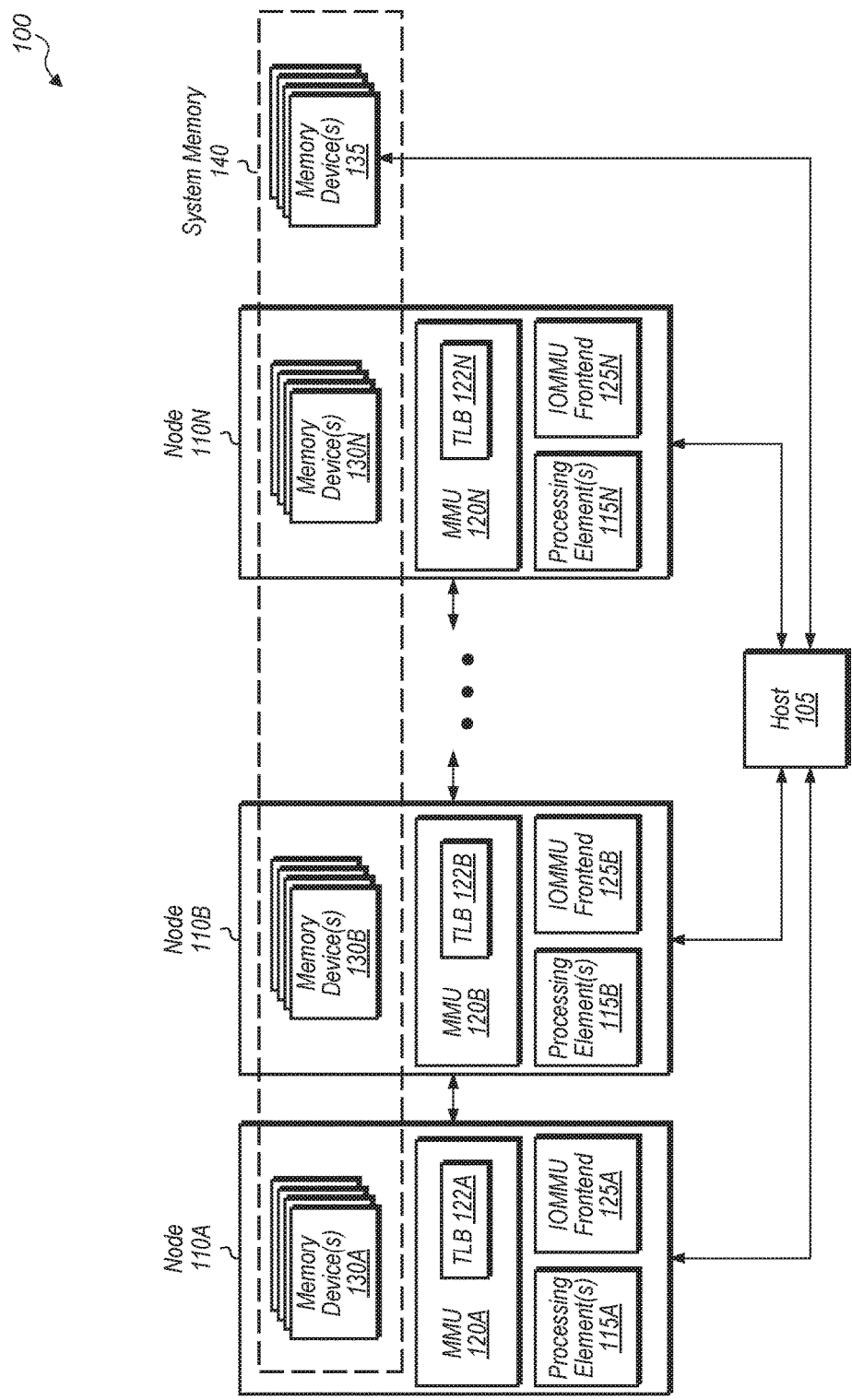
FIG. 1 is a block diagram of one embodiment of a computing system.

Referring now to FIG. 1, a block diagram illustrating one embodiment of a computing system 100 is shown. Computing system 100 may include host 105 coupled to nodes 110A, 110B, and 110N, which are representative of any number and type (e.g., peripheral device, central processing unit (CPU), graphics processing unit (GPU), accelerated processing unit (APU), processing-in-memory (PIM) node) of computing nodes. Each of nodes 110A-N may include corresponding processing element(s) 115A-N, memory management unit (MMU) 120A-N, input/output MMU (IOMMU) frontend 125A-N, and memory device(s) 130A-N. Each of nodes 110A-N may also include other components (e.g., network/bus interface, cache(s)) which are not shown to avoid cluttering the figure. In one embodiment, memory device(s) 130A-N and memory device(s) 135 may be part of the system memory 140 of system 100. In this embodiment, each of nodes 110A-N includes a portion of the system memory 140 of system 100, with system 100 optionally including additional system memory (e.g., memory device(s) 135, memory device(s) in host 105) which is external to the nodes 110A-N. Host 105 may be coupled to nodes 110A-N and memory device(s) 135 using any of various types of network and/or bus connections.

Memory devices 130A-N and 135 are representative of any number and type of memory devices. Various types of memory devices 130A-N and 135 may be utilized in system 100, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc. In various embodiments, the memory devices 130A-N and 135 may store application software, operating system software, communication libraries, and/or other software and data. Rambus is a trademark of Rambus incorporated.

In various embodiments, system 100 may be used to process and store data, perform computational tasks, and/or transmit data to other devices and systems using one or more networks (not shown). In one embodiment, system 100 may perform data processing on large datasets. For example, system 100 may be configured to execute any of various types of workloads (e.g., parallel processing applications, mapreduce operations, simulations, modeling applications) depending on the embodiment. As part of executing a workload, host 105 may be configured to distribute tasks to one or more of nodes 110A-N for processing by the node(s). It is noted that system 100 may also be referred to as a supercomputer, data center, cluster, high performance computing (HPC) cluster, or cloud computing cluster.

In one embodiment, host 105 may include one or more processors with one or more cores, and host 105 may execute a first operating system (OS) instance on the processor(s). Each of nodes 110A-N may be configured to execute an OS instance which is separate and distinct from the first OS instance running on host 105. In other words, in this embodiment, system 100 is not a symmetric multiprocessing (SMP) system. In a SMP system, host 105 and nodes 110A-N would be controlled by a single OS instance. Alternatively, in another embodiment, host 105 and nodes 110A-N may be controlled by a single OS instance and system 100 may be a SMP system. However, for the purposes of the discussion of FIG. 1, it will be assumed that the OS instances of nodes 110A-N are separate from the first OS instance of host 105.

In one embodiment, host 105 may be configured to execute a parallel processing application, and host 105 may be configured to distribute work items to be performed on the nodes 110A-N. When distributing a work item to a given node 110, host 105 may provide pointer(s) to virtual addresses as well as one or more virtual-to-physical address translations to the given node 110. To ensure that nodes 110A-N have the same view of virtual memory as host 105, host 105 may be configured to manage the virtual address space of nodes 110A-N via IOMMU frontends 125A-N, respectively. IOMMU frontends 125A-N may not include TLBs as is typically the case for a traditional IOMMU. Rather, IOMMU frontends 125A-N may share the TLB 122A-N of respective MMUs 120A-N. IOMMU frontends 125A-N may be implemented using any suitable combination of hardware and/or software.

In one embodiment, each node 110A-N may include its own CPU-style MMU 120A-N, respectively, which is compatible with the page table organization and format of host 105. Each MMU 120A-N may include a corresponding TLB 122A-N. In one embodiment, each node 110A-N may present an IOMMU-style interface to host 105 via a corresponding IOMMU frontend 125A-N. In this embodiment, the processing element(s) 115A-N of nodes 110A-N may use their local TLB 122A-N in the standard way for instruction and data address translation (i.e., table walks of the shared in-memory page tables) but configuration and management may be handled by host 105 via the IOMMU frontends 125A-N. In this way, a virtual address pointer can be freely passed between host 105 and nodes 110A-N while ensuring that the pointer resolves to the correct physical address. The processing element(s) 115A-N may utilize any of various types of processor architectures and be compatible with any of various instruction sets depending on the embodiment.

Figure 2:
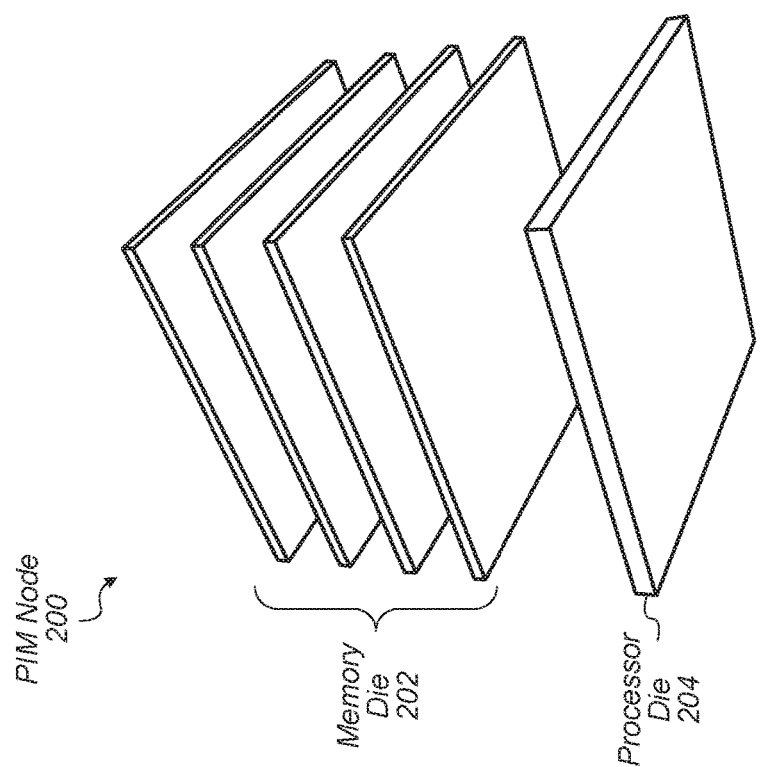
FIG. 2 is a block diagram of one embodiment of the die stack of a PIM node.

Turning now to FIG. 2, a block diagram of one embodiment of the die stack of a PIM node 200 is shown. PIM node 200 is representative of one type of a node which may be utilized as one or more of nodes 110A-N (of FIG. 1) in system 100. In one embodiment, PIM node 200 may be constructed of a vertical die stack of memory die 202 and processor die 204. Memory die 202 comprises a stacked memory device where the stacked die implement memory circuitry, such as DRAM, SRAM, ROM, and the like. In one embodiment, processor die 204 may include at least one or more processing elements (e.g., processing elements 115), a MMU (e.g., MMU 120), an IOMMU frontend (e.g., IOMMU frontend 125), and hard-wired and routing logic for accessing the memory circuitry of the stacked memory die 202. PIM node 200 may be fabricated using any of a variety of 3D integrated circuit fabrication processes.

In one embodiment, processor die 204 and memory die 202 may be implemented as separate substrates (e.g., bulk silicon) with active devices and one or more metal routing layers formed at an active surface. This approach can include a wafer-on-wafer process whereby a wafer comprising a matrix of die is fabricated and thinned, and through-silicon vias (TSVs) are etched through the bulk silicon.

Multiple wafers are then stacked to achieve the illustrated layer configuration (e.g., a stack of four wafers comprising memory circuitry die for the four memory layers and a wafer comprising the logic die for the processor layer), aligned, and then joined via thermocompression. The resulting stacked wafer set is singulated to separate the individual 3D IC device. In other embodiments, other techniques for fabricating PIM node 200 may be utilized.

In one embodiment, processor die 204 may include a DRAM memory controller which is coupled to the stacked memory die 202 via TSVs. The memory controller may be configured to perform memory accesses to the data stored in the storage cell circuitry of the stacked DRAM memory devices in response to memory access requests from one or more processor cores or processing elements on processor die 204. Processor die 204 may include a MMU for performing virtual-to-physical address translations when processing memory access requests to local and/or remote memory. The MMU of processor die 204 may be externally managed by a host (e.g., host 105) via an IOMMU frontend interface (e.g., IOMMU frontend 125). It is noted that in other embodiments, other configurations and structures of PIM nodes may be utilized.

Figure 3:
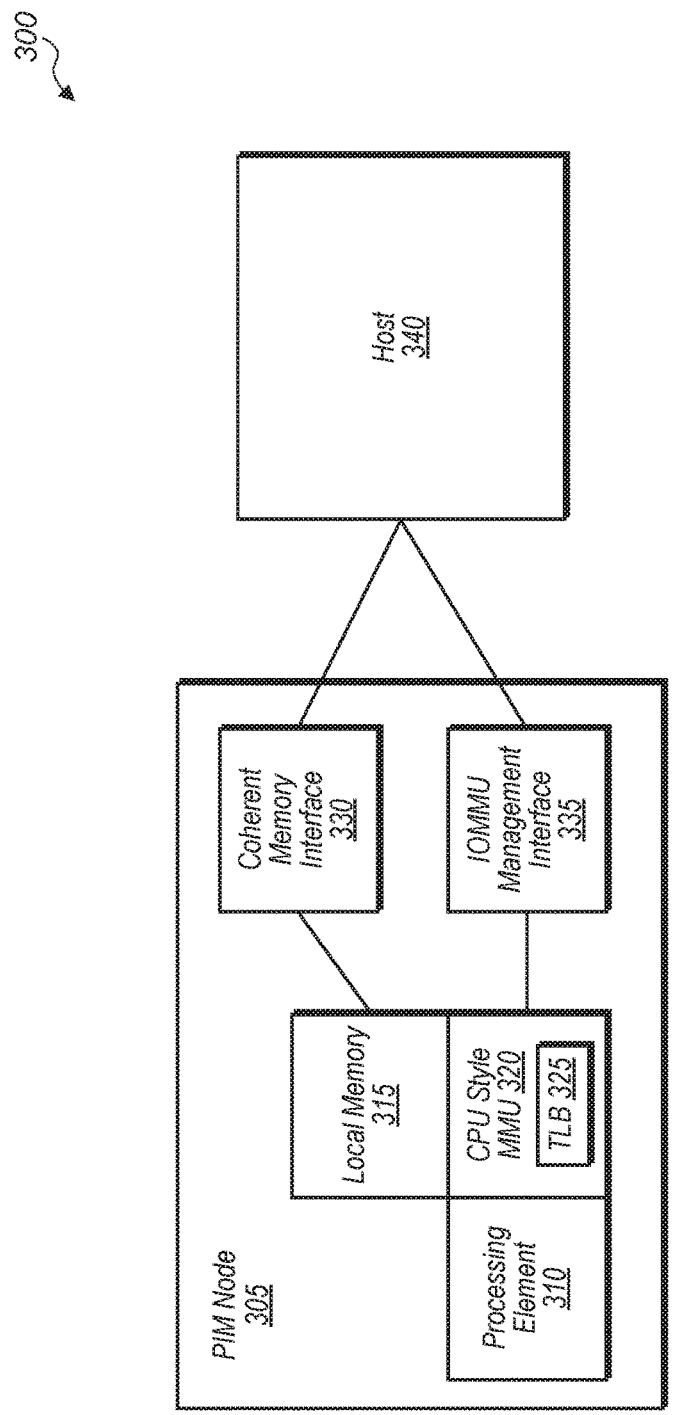
FIG. 3 is a block diagram of another embodiment of a computing system.

Referring now to FIG. 3, a block diagram illustrating another embodiment of a computing system 300 is shown. System 300 may include at least PIM node 305 and host 340. Although not shown in FIG. 3, host 340 may also be connected to any number of other PIM nodes in addition to PIM node 305. It should be noted that the example of PIM node 305 is not intended to limit the types of nodes which may utilize the methods and mechanisms described herein. Any type of computing node or processing device (e.g., APU, CPU) may be coupled to host 340 and utilize the methods and mechanisms used herein.

In one embodiment, host 340 may include one or more processors with one or more cores, and host 340 may execute an OS on the processor(s). Host 340 may be configured to execute a parallel processing application, and host 340 may be configured to distribute work items to be performed on the various nodes (e.g., PIM node 305). When distributing a work item to a node, host 340 may provide pointer(s) to the node as well as one or more virtual-to-physical address translations.

PIM node 305 may include processing element 310, local memory 315, CPU-style MMU 320 which may include TLB 325, coherent memory interface 330, and IOMMU management interface 335. IOMMU management interface 335 may also be referred to as an IOMMU frontend. In one embodiment, processing element 310 may be a CPU or CPU-like processing element. In one embodiment, host 340 may utilize standard IOMMU software for controlling the TLB 325 of PIM node 305 via IOMMU management interface 335.

PIM node 305 may present an IOMMU-style interface to host 340 using IOMMU management interface 335. IOMMU management interface 335 may not have a TLB but rather may share TLB 325 with MMU 320. In various embodiments, TLB 325 may be implemented in a content addressable memory (CAM) to accelerate translation of virtual memory addresses to physical memory addresses for requests made by processing element 310 for instructions or data in system memory. In one embodiment, processing element 310 may utilize TLB 325 in the typical way for instruction and data address translation (i.e., table walks of the shared in-memory page tables) but configuration and management may be handled by host 340 via IOMMU management interface 335. In one embodiment, TLB 325 may be compatible with the page table organization and format of host 340.

It should be understood that the example of PIM node 305 coupled to host 340 is merely one scenario in which the methods and mechanisms described herein may be implemented. In other embodiments, other devices and/or systems may utilize similar techniques to gain similar advantages. For example, in another embodiment, a TCP/IP offload engine on an Ethernet controller may utilize an IOMMU management interface (or similar functionality) to allow its view of virtual memory to be externally managed. In a further embodiment, a storage controller which performs encryption of store data may also utilize an IOMMU management interface to allow its view of virtual memory to be externally managed. Other scenarios for utilizing the techniques described herein for external management of virtual memory are possible and are contemplated.

Figure 4:
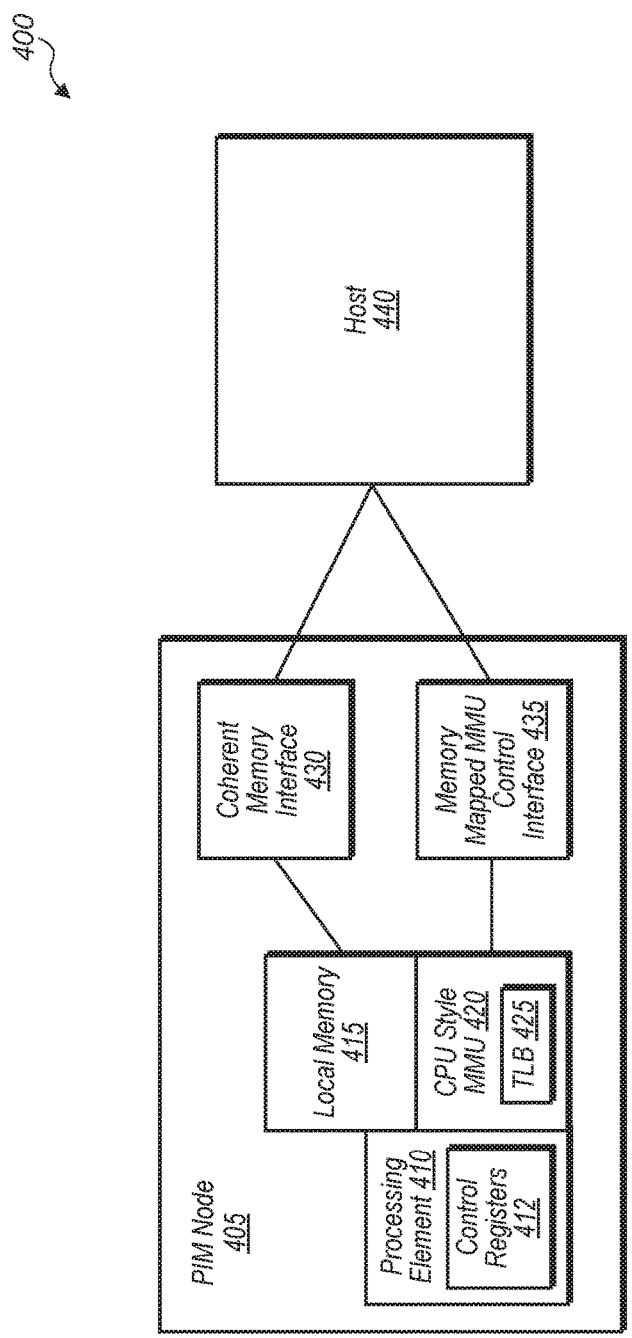
FIG. 4 is a block diagram of another embodiment of a computing system.

Turning now to FIG. 4, a block diagram illustrating another embodiment of a computing system 400 is shown. Computing system 400 may include host 440 and PIM node 405 and any number of other PIM nodes (not shown). PIM node 405 may include processing element 410, local memory 415, CPU style MMU 420 with TLB 425, coherent memory interface 430, and memory mapped MMU control interface 435. In contrast to system 300 of FIG. 3, PIM node 405 may include a plurality of memory mapped registers (e.g., control registers 412) which may be written to by host 440 via memory mapped MMU control interface 435. This provides a different technique for host 440 to externally manage the virtual address space of PIM node 405.

The number of nodes coupled to host 440 may vary from embodiment to embodiment. Typically, the overhead involved in host 440 managing the virtual address space management will increase as the number of nodes increases. In some embodiments, the same information (e.g., base of page table, page invalidation) may be sent to each of the nodes. In some cases, host 440 may send a broadcast message with various commands and settings to all of the nodes to reduce the amount of message traffic.

Referring now to FIG. 5, a table 500 of processor control registers which may be controlled externally is shown. The control registers in table 500 are representative of control registers 412 of FIG. 4. In one embodiment, processing element 410 may be based on the x86 architecture, and the control registers 412 shown in FIG. 4 are specific to the x86 architecture. In other embodiments with other types of processing elements, other control registers may be utilized.

In various embodiments, a memory mapped MMU control interface (e.g., memory mapped MMU control interface 435) may allow a host (e.g., host 440) to access various control registers affecting the node's view of the system's virtual address space. In one embodiment, these control registers may include register CR0 which has various control flags that modify the operation of processing element 410. For example, bit 31 of CR0 is the PG flag which enables paging for processing element 410. Also, control register CR2 may store the virtual address on a page fault exception. Control register CR3 may store the base address of the highest level page table as well as storing cache controls for the specified table.

Other control registers include the extended feature enable register (or EFER). The .LME bit corresponds to long mode enable and the .LMA bit corresponds to long mode active and may be set by the processor (e.g., processing element 410). The .TCE bit corresponds to translation cache extension and when the .TCE bit is set, this allows the INVLPG instruction to invalidate upper level TLB entries which lead to the target page table entry (PTE). Otherwise, when the .TCE bit is not set, all upper level TLB entries are invalidated. The .PGE bit of the CR4 control register enables sharing address translations between address spaces, the CR4.PAE bit controls the physical address extension of 32-bit virtual addresses into 36-bit physical addresses, and the CR4.PSE bit controls page size extensions and enables 4-MB pages. It is noted that the control registers listed in table 500 are indicative of the control registers that may be programmed by a host in one embodiment. In other embodiments, other control registers of a node affecting the node's view of virtual address space may be controlled by the host via a memory mapped MMU control interface.

Figure 6:
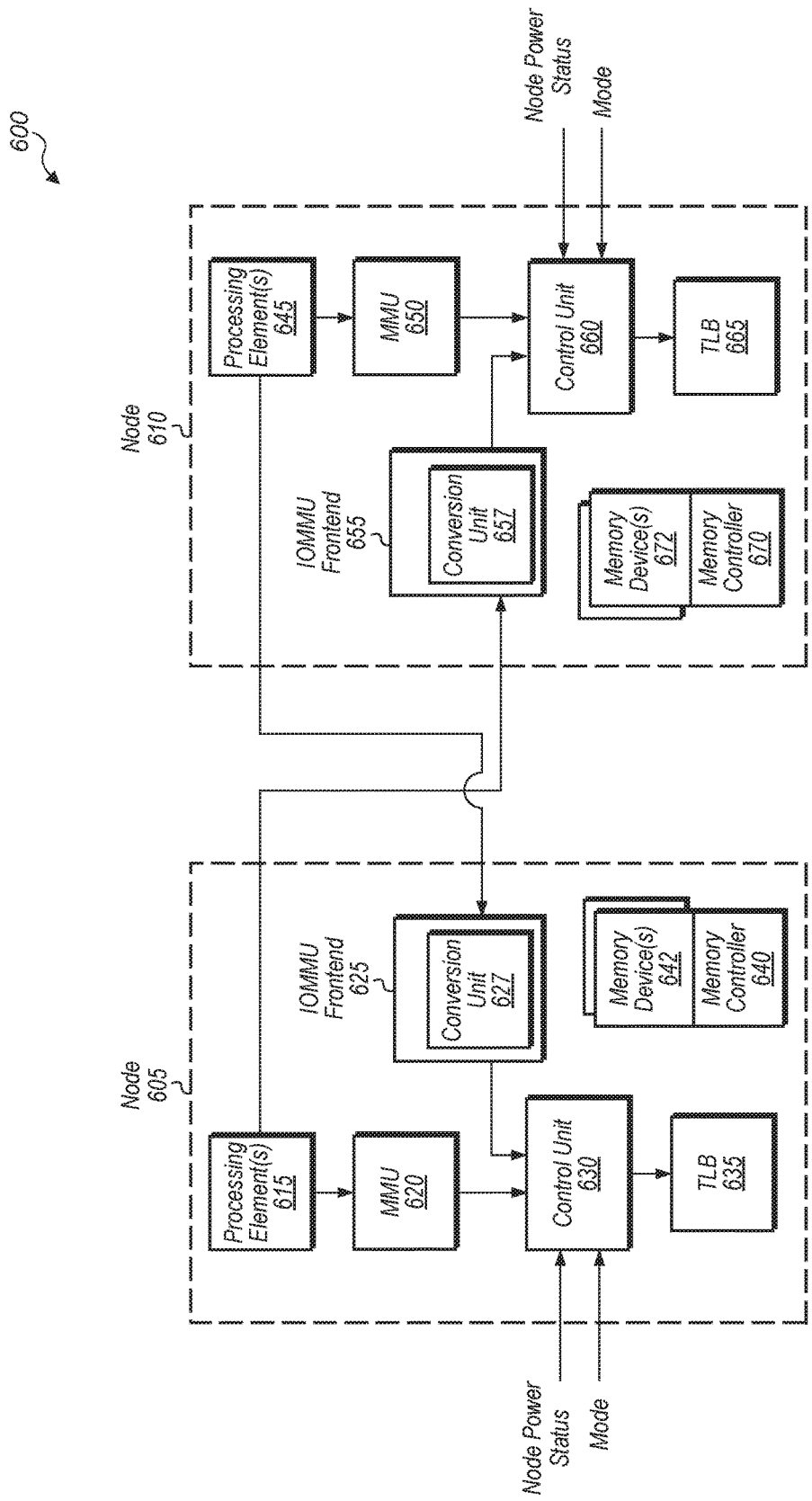
FIG. 6 is a block diagram illustrating one embodiment of a computing system.

Turning now to FIG. 6, a block diagram illustrating one embodiment of a computing system 600 is shown. System 600 may include at least node 605 and node 610. Node 605 may include processing element(s) 615, MMU 620, IOMMU frontend 625, control unit 630, TLB 635, memory controller 640, and memory device(s) 642. Control unit 630 may allow for either node 605 or node 610 to manage the memory management functions of node 605, depending on the power status of each node and/or the operating mode. IOMMU frontend 625 may include conversion unit 627 which may be configured to convert IOMMU commands and parameters into MMU commands and parameters consistent with MMU control of the virtual address space.

Node 610 may include similar or equivalent circuitry to node 605, with node 610 including processing element(s) 645, MMU 650, IOMMU frontend 655 including conversion unit 657, control unit 660, TLB 665, memory controller 670, and memory device(s) 672. Control unit 660 may allow for either node 610 or node 605 to manage the memory management functions of node 610. It is noted that nodes 605 and 610 may also include other components which are not shown to avoid obscuring the figure. Nodes 605 and 610 are representative of any type of node (e.g., processor, PIM node). For the purposes of this discussion, a node is defined as any computing system or apparatus with one or more processing elements (e.g., processor, processor core, programmable logic device, application specific integrated circuit, accelerated processing unit, graphics processing unit) and one or more memory devices. The one or more processing elements of the node may be configured to execute instructions and/or perform one or more types of computations (e.g., floating point, integer, memory, I/O) depending on the embodiment.

In one embodiment, node 605 may include more computing resources and/or consume more power relative to node 610. In this embodiment, node 605 may be turned off (or put into a low-power state) when the processing load on system 600 is low, with only node 610 being powered on during this time. When the system workload increases sufficiently, node 605 may be turned on and processing may transition to node 610. As part of activating node 605, node 610 may cause a plurality of translations to be pre-populated in TLB 635 of node 605, thus avoiding future TLB misses and reducing the startup latency of node 605. In one embodiment, node 610 may write the translations directly into TLB 635. In another embodiment, node 610 may queue one or more PREFETCH_IOMMU_PAGES commands in the memory of node 605 as part of activating node 605. Then, as part of its startup routine, node 605 may process the queued command(s), causing translation entries to be fetched and loaded into TLB 635.

Depending on the embodiment, node 610 may utilize different techniques for determining which sets of translations to pre-populate into the TLB 635 of node 605. In one embodiment, node 610 may select the translations which are already present in TLB 665 to be loaded into TLB 635. In another embodiment, node 610 may determine the translations that will be needed by the application(s) node 605 will run when it wakes up, and then node 610 may pre-populate TLB 635 with these translations, which may be different translations than those that are stored in TLB 665.

In another embodiment, node 605 may be a host processor and node 610 may be a PIM node. In this embodiment, node 605 may send a kernel to node 610. As part of dispatching the kernel to node 610, node 605 may queue one or more PREFETCH_IOMMU_PAGES commands to populate TLB 665 of node 610. Alternatively, node 605 may write the translations directly into TLB 665 of node 610 via IOMMU frontend 655 and control unit 660.

In various embodiments, control units 630 and 660 may be configured to disable processing elements' 615 and 645 control over TLBs 635 and 665, respectively. When local control of TLBs 635 and 665 is disabled, control units 630 and 660 may be configured to enable external control of TLBs 635 and 665, respectively. Control units 630 and 660 may receive node power status information and/or mode status to determine when to disable local control and enable external control of TLBs 635 and 665, respectively. In one embodiment, node 605 may be configured to handle memory management for node 610 while system 600 is in a first mode, and node 610 may be configured to handle memory management for node 605 while system 600 is in a second mode. Additionally, in another embodiment, node 605 may be configured to manage a first portion of TLB 635 and node 610 may be configured to manage a second portion of TLB 635 while system 600 is in a third mode, wherein the first portion of TLB 635 is different from the second portion of TLB 635. In a further embodiment, node 605 may be configured to manage a first portion of the virtual address space utilized by node 610 and node 610 may be configured to manage a second portion of the virtual address space utilized by node 610 while system 600 is in a fourth mode, wherein the first portion of the node 610 virtual address space is different from the second portion of the node 610 virtual address space. Variations of different modes and schemes of sharing memory management functions, TLB portions, and/or virtual address space portions among a plurality of nodes are possible and are contemplated.

Figure 7:
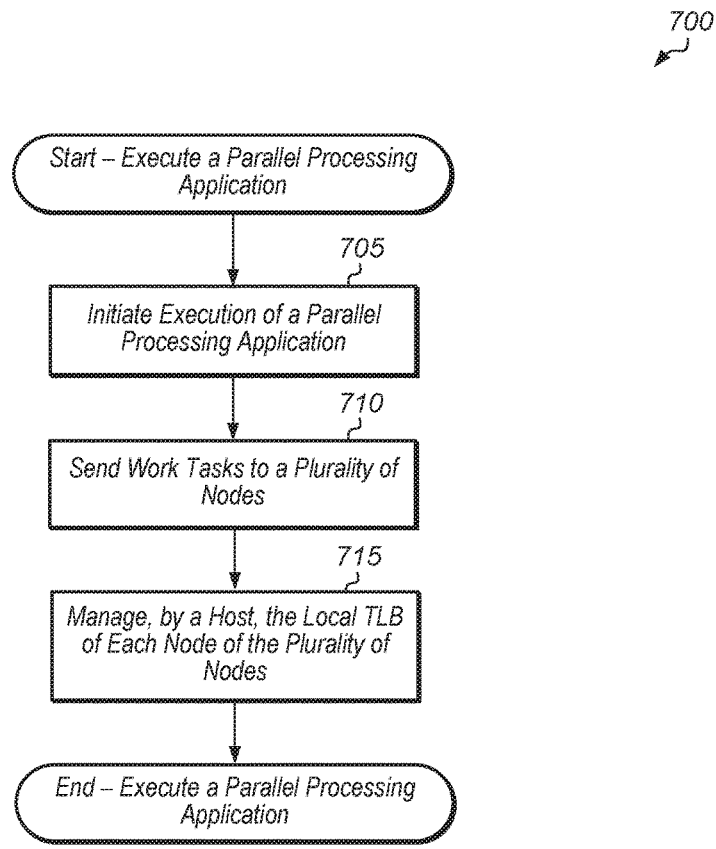
FIG. 7 is a generalized flow diagram illustrating one embodiment of a method for executing a parallel processing application.

Referring now to FIG. 7, one embodiment of a method 700 for executing a parallel processing application is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, hosts, nodes, processors, processing elements, and/or control logic described herein may be configured to implement method 700.

A host may initiate execution of a parallel processing application (block 705). The host may execute a first OS instance and may be coupled to a plurality of nodes. In one embodiment, the nodes may be PIM nodes. In other embodiments, the nodes may be other types of computing systems or apparatuses. The nodes may execute other OS instances which are different from the first OS instance, and in some cases may be schedulers or other stripped down OS instances. Additionally, it may be assumed for the purposes of this discussion that each of the nodes includes its own local TLB.

Next, the host may send work tasks to a plurality of nodes (block 710). Additionally, the host may manage the local TLB of each node of the plurality of nodes while the nodes perform their assigned work tasks (block 715). In one embodiment, managing the local TLB of each node may comprise determining which virtual-to-physical address translations each node will need in order to process its assigned work task. In this embodiment, managing the local TLB of each node may comprise populating and invalidating the entries of the local TLB of each node as the node processes its task. In another embodiment, managing the local TLB of each node may comprise updating control registers associated with memory management functions and updating control registers associated with the local TLB. After block 715, method 700 may end.

Figure 8:
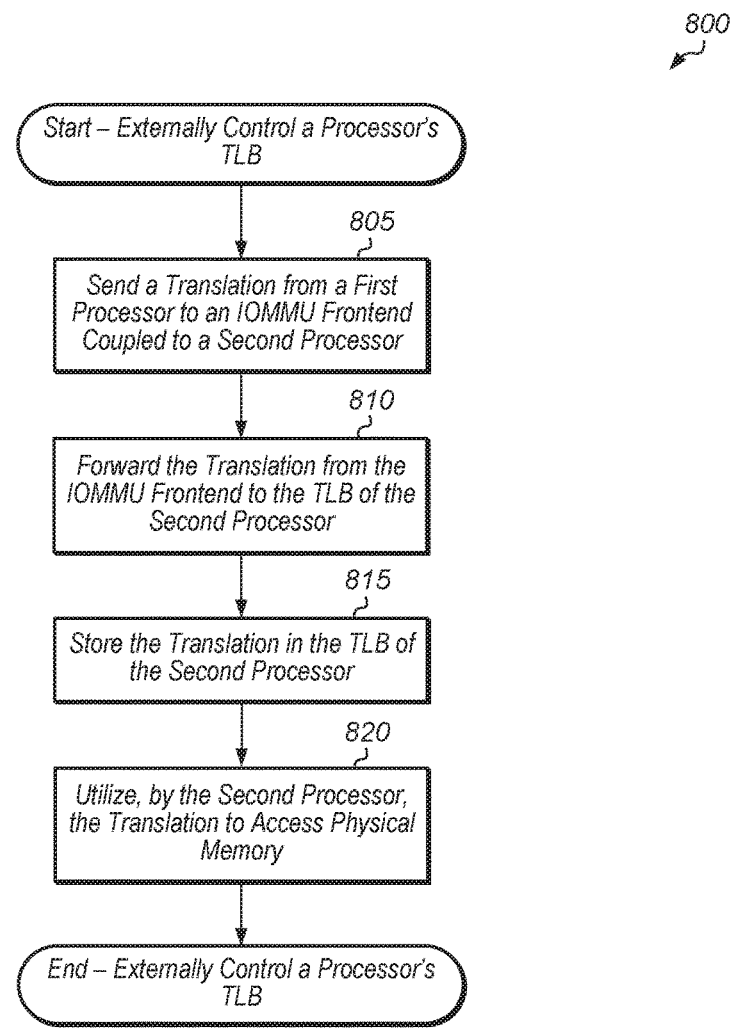
FIG. 8 is a generalized flow diagram illustrating another embodiment of a method for externally controlling a processor's TLB.

Turning now to FIG. 8, one embodiment of a method 800 for externally controlling a processor's TLB is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, hosts, nodes, processors, processing elements, and/or control logic described herein may be configured to implement method 800.

A first processor may send a translation to an IOMMU frontend coupled to a second processor (block 805). In one embodiment, the translation may be a virtual-to-physical address translation. In one embodiment, the first processor and second processor may utilize different operating system instances rather than sharing the same operating system instance. In other words, in this embodiment, the first and second processors may not be part of a symmetric multiprocessor system. The translation may be sent in response to any of a variety of conditions being detected, and the translation may be sent as part of a group of translations in some cases. The IOMMU frontend may forward the translation to the TLB of the second processor (block 810). A traditional IOMMU would receive the translation and use the translation to update the TLB inside of the IOMMU. Next, the translation may be stored in the TLB of the second processor (block 815). Then, the second processor may utilize the translation in the TLB to access physical memory (block 820). After block 820, method 800 may end.

Figure 9:
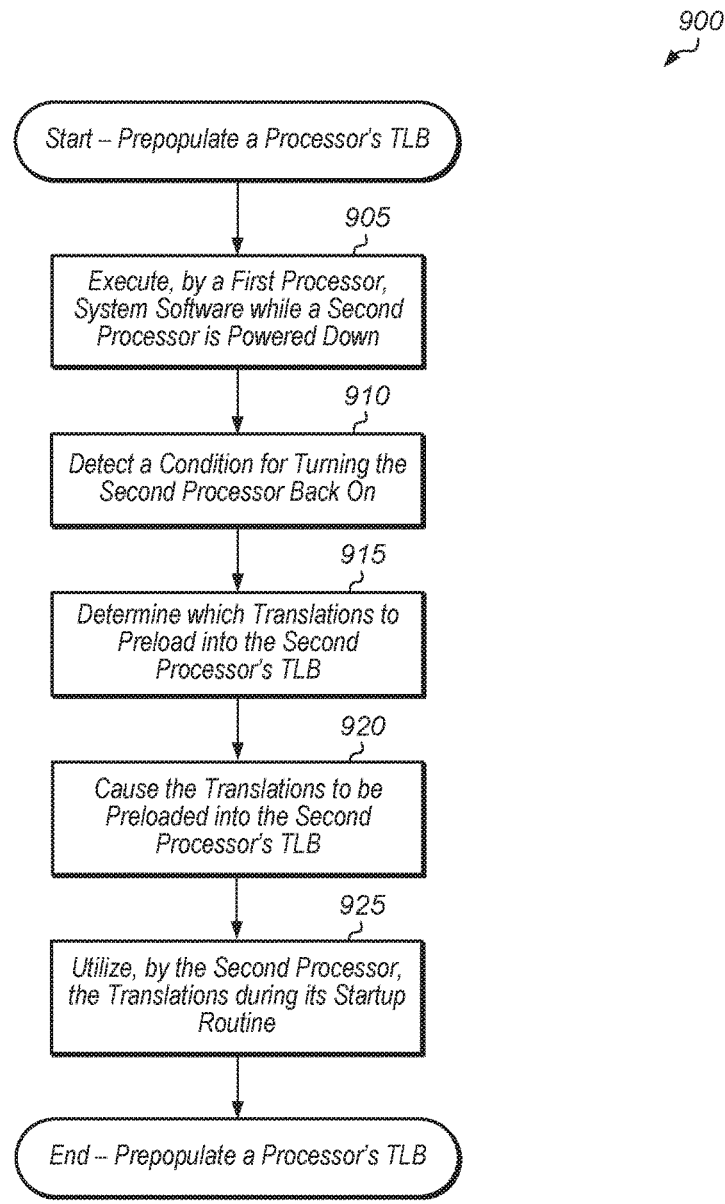
FIG. 9 is a generalized flow diagram illustrating one embodiment of a method for prepopulating a processor's TLB.

Turning now to FIG. 9, one embodiment of a method 900 for prepopulating a processor's TLB is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, hosts, nodes, processors, processing elements, and/or control logic described herein may be configured to implement method 900.

A first processor (e.g., multi-core processor) may execute system software while a second processor is powered down in a system with multiple processors (block 905). In one embodiment, the system may have a heterogeneous architecture with the first processor consuming less power than the second processor. In this embodiment, the first processor may manage execution of software during a low-power mode or in situations when the system is experiencing low processing loads. In another embodiment, the system may have a homogeneous architecture wherein the first and second processors are similar or equivalent.

While the first processor is executing the system software, the first processor and/or system control logic may detect a condition for turning the second processor back on (block 910). Depending on the embodiment, the condition may be detecting an increased processing load, additional applications being executed, an external power supply being connected to the system, a user action, and/or one or more other conditions. In response to detecting the condition, the first processor may determine which translations should be pre-loaded into the TLB of the second processor (block 915). In one embodiment, the first processor may select the translations stored in the TLB of the first processor. In another embodiment, the first processor may determine the tasks the second processor will be performing when it wakes up, and then the first processor may select the translations that will be utilized when the second processor is performing these tasks.

Next, the first processor may cause the selected translations to be pre-loaded into the TLB of the second processor (block 920). In one embodiment, the first processor may write the selected translations into the TLB of the second processor. In another embodiment, the first processor may generate one or more prefetch commands which will then cause the second processor to prefetch the translations during its startup routine. Then, the second processor may utilize the selected translations during its startup routine (block 925). By preloading translations in the TLB of the second processor, the startup latency of the second processor may be reduced. After block 925, method 900 may end.

Figure 10:
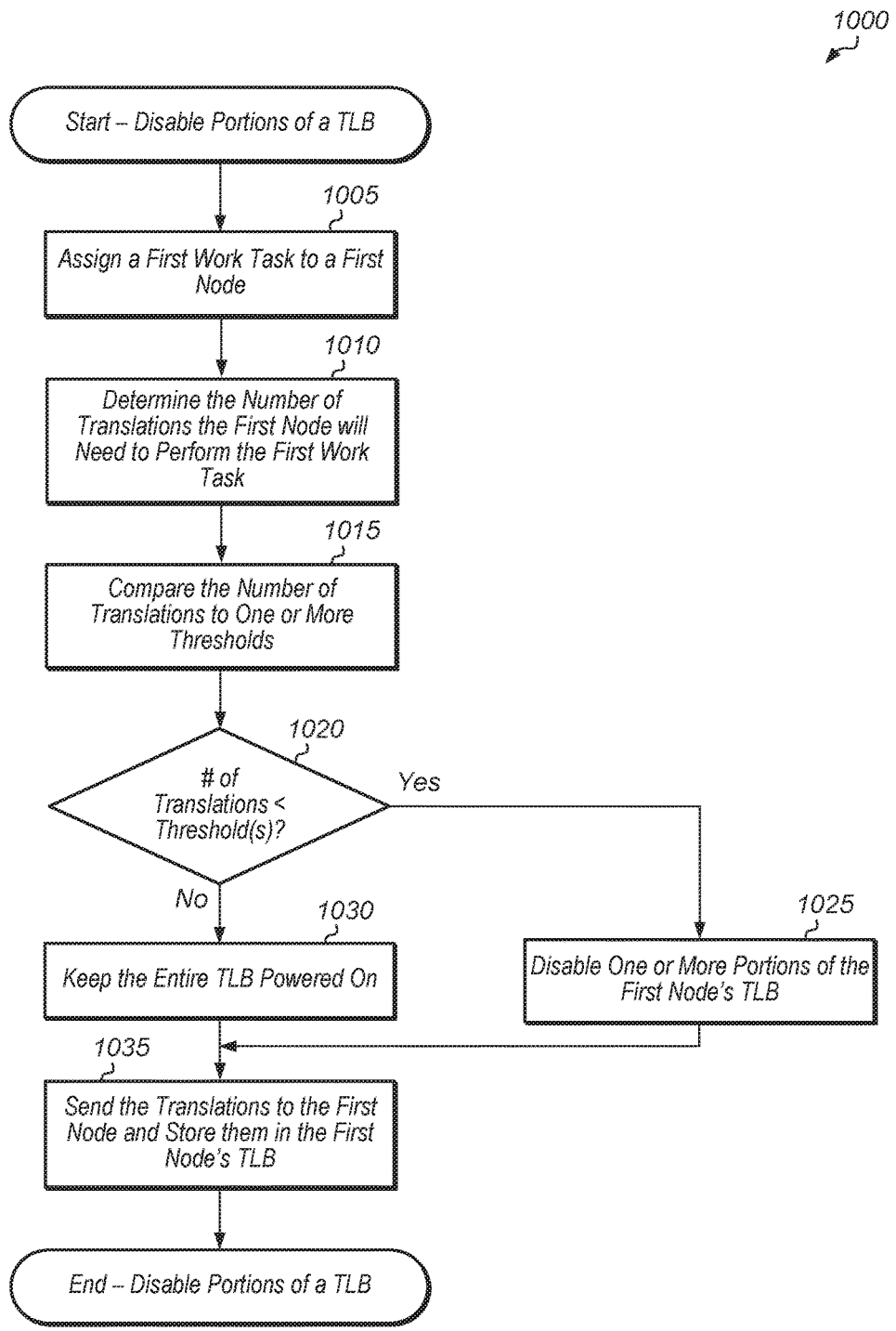
FIG. 10 is a generalized flow diagram illustrating another embodiment of a method for disabling portions of a TLB.

Turning now to FIG. 10, one embodiment of a method 1000 for disabling portions of a TLB is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, hosts, nodes, processors, processing elements, and/or control logic described herein may be configured to implement method 1000.

A host may assign a first work task to a first node (block 1005). The host may also assign a plurality of other work tasks to a plurality of other nodes as part of a parallel processing application. As part of assigning the first work task to the first node, the host may determine the number of virtual-to-physical translations the first node will need in order to perform the first work task (block 1010). The host and/or first node may then compare the number of translations to one or more thresholds (conditional block 1015). The number of thresholds used for comparison to the number of translations may vary depending on the embodiment.

If the number of translations is less than one or more thresholds (conditional block 1020, "yes" leg), then the first node may disable one or more portions of the TLB (block 1025). If the number of translations is greater than the one or more thresholds (conditional block 1020, "no" leg), then the entire TLB may remain powered on (block 1030). For example, if only 4 translations are needed by the first node, then the first node may only keep a portion of the TLB powered on which is needed to store the 4 translations. For the purposes of this discussion, it is assumed that the first node is able to power down portions of the TLB in order to conserve power. In one embodiment, the first node may have a TLB which is partitioned into four sections, and in this embodiment, the number of translations may be compared to three thresholds. If the number of translations is less than a first threshold, then the first node may power down three sections of the TLB, else if the number of translations is less than a second threshold, then the first node may power down two sections of the TLB, else if the number of translations is less than a third threshold, then the first node may power down one section of the TLB. Otherwise, the first node may keep all four sections of the TLB powered on. Also, if no translations are needed by the first node, then the first node may shut the entire TLB down. Other embodiments may utilize similar techniques for shutting down portions of the TLB to reduce the power consumption of the first node depending on the number of independently-powered sections in the TLB and the number of translations that can be stored per section. After blocks 1025 and 1030, the host may send the translations to the first node which may store them in the TLB (block 1035). After block 1035, method 1000 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a first processor comprising an interface and a first translation lookaside buffer (TLB) configured to store virtual-to-physical address translations; and
a second processor comprising a second TLB different from the first TLB; wherein: in a first mode of operation, the first processor is configured to control the first TLB for the first processor; and in a second mode of operation, external control of the first TLB by a second processor is enabled in which the second processor is able to write virtual-to-physical address translations into the first TLB;
wherein in the second mode of operation the second processor is configured to:
send a work task to the first processor for processing by the first processor;
determine one or more virtual-to-physical address translations the first processor will need in order to process the work task; and
convey the determined one or more virtual-to-physical address translations to the first processor via the interface for storage in the first TLB of the first processor.

2. The system as recited in claim 1, wherein in response to determining a number of the one or more virtual-to-physical address translations determined by the second processor is below a threshold, the first processor is configured to disable one or more portions of the first TLB.

3. The system as recited in claim 1, wherein: in the first mode of operation, the first processor handling memory management for the first processor; and in the second mode of operation, the external processor is able to directly write virtual-to-physical address translations into the first TLB.

4. The system as recited in claim 1, wherein the second processor is further configured to write to one or more control registers for modifying operation of the first processor, wherein a given control register of the one or more control registers is configured to store a virtual address of a page fault exception.

5. The system as recited in claim 1, wherein the interface comprises an input/output memory management unit (IOMMU) frontend of the first processor, and wherein the IOMMU frontend is configured to forward the received virtual-to-physical address translations to the first TLB, and wherein the IOMMU frontend does not include a TLB.

6. The system as recited in claim 1, wherein the first processor in a first processing device comprises at least a portion of system memory utilized by the second processor in a second processing device that is different from the first processing device, and wherein the first and second processors execute different operating system instances.

7. The system as recited in claim 1, wherein in a given mode of operation, the first processor is powered down and the second processor is active, and wherein in response to detecting a condition for activating the first processor, the second processor is configured to:
activate the first processor;
select virtual-to-physical address translations based on one or more of:
virtual-to-physical address translations stored in the TLB of the second processor; and
virtual-to-physical address translations utilized by tasks the second processor determines the first processor will be performing upon waking up; and
preload the first TLB with the selected virtual-to-physical address translations.

8. A method comprising:
storing, by a first processor comprising an interface and a first translation lookaside buffer (TLB), virtual-to-physical address translations in the first TLB;
sending, by a second processor comprising a second TLB different from the first TLB, a work task to the first processor for processing by the first processor;
determining, by the second processor, one or more virtual-to-physical address translations the first processor will need in order to process the work task; and
conveying, by the second processor, the determined one or more virtual-to-physical address translations to the first processor via the interface for storage in the first TLB of the first processor in a first mode of operation, the first processor controlling the first TLB for the first processor; and in a second mode of operation, enabling external control of the first TLB by an external processor in which the external processor is able to write virtual-to-physical address translations into the first TLB; in the second mode of operation.

9. The method as recited in claim 8, wherein in response to determining a number of the one or more virtual-to-physical address translations determined by the second processor is below a threshold, the first processor is configured to disable one or more portions of the first TLB.

10. The method as recited in claim 8, wherein the method further comprises: the first processor handling memory management for the first processor, in the first mode of operation; and in the second mode of operation, the external processor is able to directly write virtual-to-physical address translations into the first TLB.

11. The method as recited in claim 8, further comprising writing, by the second processor, to one or more control registers for modifying operation of the first processor, wherein a given control register of the one or more control registers is configured to store a virtual address of a page fault exception.

12. The method as recited in claim 8, wherein the interface comprises an input/output memory management unit (IOMMU) frontend of the first processor, and the method further comprises the IOMMU forwarding the received one or more virtual-to-physical address translations to the first TLB, wherein the IOMMU frontend does not include a TLB.

13. The method as recited in claim 8, wherein the first processor in a first processing device comprises at least a portion of system memory utilized by the second processor in a second processing device that is different from the first processing device, and wherein the first and second processors execute different operating system instances.

14. The method as recited in claim 8, wherein in a given mode of operation, the first processor is powered down and the second processor is active, and wherein in response to detecting a condition for activating the first processor, the method comprises the second processor:
activating the first processor;
selecting virtual-to-physical address translations based on one or more of:
virtual-to-physical address translations stored in the TLB of the second processor; and
virtual-to-physical address translations utilized by tasks the second processor determines the first processor will be performing upon waking up; and
preloading the first TLB with the selected virtual-to-physical address translations.

15. A non-transitory computer readable storage medium storing program instructions, wherein the program instructions are executable to:
store, by a first processor comprising an interface and a first translation lookaside buffer (TLB), virtual-to-physical address translations in the first TLB; and
send, by a second processor comprising a second TLB different from the first TLB, a work task to the first processor for processing by the first processor; in a first mode of operation, the first processor controlling the first TLB for the first processor; and in a second mode of operation, enabling external control of the first TLB by an external processor in which the external processor is able to write virtual-to-physical address translations into the first TLB; in the second mode of operation:
determine, by the second processor, one or more virtual-to-physical address translations the first processor will need in order to process the work task; and
convey, by the second processor, the determined one or more virtual-to-physical address translations to the first processor via the interface for storage in the first TLB of the first processor.

16. The non-transitory computer readable storage medium as recited in claim 15, wherein in response to determining a number of the one or more virtual-to-physical address translations determined by the second processor is below a threshold, the first processor is configured to disable one or more portions of the first TLB.

17. The non-transitory computer readable storage medium as recited in claim 15, where the program instructions are further executable to: enable the first processor to handle memory management for the first processor, in the first mode of operation; and in the second mode of operation, the external processor is able to directly write virtual-to-physical address translations into the first TLB.

18. The non-transitory computer readable storage medium as recited in claim 15, wherein the program instructions are further executable by a processor to write, by the second processor, to one or more control registers for modifying operation of the first processor, wherein a given control register of the one or more control registers is configured to store a virtual address of a page fault exception.

19. The non-transitory computer readable storage medium as recited in claim 15, wherein the interface comprises an input/output memory management unit (IOMMU) frontend of the first processor, and wherein the program instructions are further executable to cause the IOMMU to forward the received one or more virtual-to-physical address translations to the first TLB, wherein the IOMMU frontend does not include a TLB.

20. The non-transitory computer readable storage medium as recited in claim 15, wherein in a given mode of operation, the first processor is powered down and the second processor is active, and wherein in response to detecting a condition for activating the first processor, the program instructions are executable to:
activate the first processor;
select virtual-to-physical address translations based on one or more of:
virtual-to-physical address translations stored in the TLB of the second processor; and
virtual-to-physical address translations utilized by tasks the second processor determines the first processor will be performing upon waking up; and
preload the first TLB with the selected virtual-to-physical address translations.

* * * * *